United States Patent
Nelson et al.

(10) Patent No.: US 7,631,352 B1
(45) Date of Patent: Dec. 8, 2009

(54) LINK2FILE AUTOMATED COMPUTER LOCATION AND LINKING SYSTEM

(76) Inventors: Daniel John Nelson, 12562 Leatherleaf Dr., Tampa, FL (US) 33626; Luis Alberto Figarella, 27 Todd Rd., Nashua, NH (US) 03064

(*) Notice: Subject to any disclaimer, the term of this patent is extended or adjusted under 35 U.S.C. 154(b) by 673 days.

(21) Appl. No.: 11/309,057

(22) Filed: Jun. 14, 2006

Related U.S. Application Data

(60) Provisional application No. 60/690,439, filed on Jun. 15, 2005.

(51) Int. Cl.
*G06F 9/00* (2006.01)
*G06F 15/16* (2006.01)
*G06F 17/00* (2006.01)
*G06F 15/177* (2006.01)
*G06F 15/173* (2006.01)

(52) U.S. Cl. .......... 726/15; 709/223; 709/242; 709/203; 709/220; 709/231

(58) Field of Classification Search .......... 726/15; 709/220, 223, 203, 231, 242
See application file for complete search history.

(56) References Cited

U.S. PATENT DOCUMENTS

| | | | |
|---|---|---|---|
| 6,094,676 A | 7/2000 | Gray | 709/217 |
| 6,269,099 B1 | 7/2001 | Borella | 370/389 |
| 6,424,653 B1* | 7/2002 | Arsikere et al. | 370/401 |
| 6,961,322 B2 | 11/2005 | Viola | 370/328 |
| 6,961,336 B2 | 11/2005 | Coggeshall | 370/389 |
| 6,961,783 B1 | 11/2005 | Cook | 709/245 |
| 6,961,858 B2 | 11/2005 | Fransdonk | 713/202 |
| 2003/0105812 A1* | 6/2003 | Flowers et al. | 709/203 |
| 2003/0188019 A1* | 10/2003 | Wesley | 709/245 |
| 2003/0217140 A1* | 11/2003 | Burbeck et al. | 709/224 |
| 2004/0136244 A1* | 7/2004 | Nakamura et al. | 365/200 |
| 2004/0139228 A1* | 7/2004 | Takeda et al. | 709/245 |
| 2005/0086288 A1 | 4/2005 | Datta | 709/201 |
| 2005/0195838 A1 | 9/2005 | Teodosiu | |
| 2005/0240665 A1 | 10/2005 | Gu | |

* cited by examiner

*Primary Examiner*—Shin-Hon Chen
(74) *Attorney, Agent, or Firm*—Luis Figarella

(57) ABSTRACT

Link2File, A method to allow computers connected to the Internet to find each other, identify specific files, video and/or audio channels within them and automatically initiate actions (such as peer-to-peer file transfers or video feeds), even when their Internet Protocol (IP) address is reassigned at random by a third-party.

3 Claims, 2 Drawing Sheets

LINK2FILE AUTOMATED COMPUTER LOCATION AND LINKING SYSTEM

BACKGROUND OF THE INVENTION

1. Field of the Invention

The present invention relates to peer-to-peer (P2P) computer communication, and specifically to a method by which computers can find and identify each other in the Internet, even when their Internet Protocol (IP) address is reassigned at random by a third-party.

2. Description of the Related Art

Computers connected to the Internet using broadband connections usually do this via three primary types of gateways; a cable modem, a DSL modem, or a Local Area Network (LAN) [be it wired or wireless]. The function of the Internet gateway is to become the residence of a unique Internet Protocol (IP) address. This IP address is represented as a four group numerical address (in the format W.X.Y.Z where each letter represents a binary value between 0 and 255), that uniquely identifies each gateway to every other computer in the Internet.

Most users of broadband Internet have contracts that specify that their IP address may be dynamically altered by their Internet Service Provider (ISP). That is, their ISP (be it the phone or cable company, or another supplier) reserves the right to arbitrarily re-assign the IP Address for their gateway. This means that the device's unique address (and hence how it is known to other computers out in the Internet) is subject to change at the whim of the ISP. By changing the IP address, automated peer-to-peer (P2P) connections between machines becomes very difficult (since the connecting machines identities are suddenly in doubt). Gray et al., U.S. Pat. No. 6,094,676 teaches how to implement a P2P link.

The ISPs do this because they want assurance that users making their computers into web servers pay more than users who simply web-browse, two applications that require very different amounts of bandwidth. In the early days of the Internet, when most users dialed in at very slow speeds, there were no risks of any of them using these dial-up connections to make their computers into web-servers. However, as the connections increased in speeds, the temptation was there to convert home computers into web-servers. In fact, when early cable modems used static IP addresses, with the consequence that many early adopters took advantage of these to make their home computers into web-servers. To limit this perceived mis-use of their service, broadband ISP contracts specify that IP addresses in the cable modem may not be converted to static IP's, and most recently have begun forcing changes on internet gateway IP addresses during lulls in use.

Because ISP's change the IP address, it becomes difficult for Internet users to have a file reside in their computer (or connect a web-camera) and automatically transfer this information to others (the typical function of a web-server). Borella et al., U.S. Pat. No. 6,269,099 teaches a method to do this in a P2P environment, but this has limited viability. Given these limitations, user's typically share files by attaching them to e-mails. However, in order to limit the use of their bandwidth, most e-mail providers limit the size of attachments to files no larger than 10 or 20 Mbytes. With the wide availability of digital media in which to store home movies, many users are hard pressed to find ways in which to electronically share home movie files that are typically in the 10 MB per minute range.

Today, the primary alternative left to users wanting to share large files is the use of large capacity/large transfer web-site. Unfortunately, services such as these are geared towards commercial users (with round-the-clock availability and expected large transfers), hence they are expensive and complicated. Finally, they are by definition cumbersome. Using a web-server to transfer a large file requires the file to be transferred and stored from the originator's computer to the web-server (essentially a computer that has a static IP address), where it resides until requested by someone for download. If the originator decides to make any changes to the file, he/she must first re-download it (assuming a local copy was not kept), then re-upload it.

What is required, is a method that would allow someone to identify a file within their computer (or a web-camera link) and communicate to someone else via a brief message the location of this device, then make it available so that it may be located by others in a secure fashion.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The Link2File (L2F) system addresses the shortcoming above by allowing the originators of large files or data transactions the ability to use their own broadband link (and computer) to store and serve this data to interested third parties, via a peer-to-peer (P2P) transfer that allows for the IP address to be randomly changed by a third party. The L2F system would use a centralized server as a location where users can constantly correlate their IP address to their identity, but use their own resources in a P2P environment to communicate the actual data. Thus if the ISP changes the IP address, the L2F system will take note of that and allow for that identity/IP address link to remain up-to-date.

What makes the system possible, is the establishment of L2F as an identity to IP address mapping service. With L2F, a user having a laptop (whose IP address changes as the user moves from mobile hotspot to mobile hotspot) may be able to serve large data transactions (be they files or live video/audio feeds) to others from any location and/or IP address, and yet have people interface to his/her laptop if it never left the original IP location.

By allowing the user to post a link to a file (via e-mail or web-site) in his/her own computer, rather than sending the complete file, the L2F service offers Internet users an alternative method to either getting a static IP address or a web-server. Again, it should be noted that this file may be the output of a microphone, or video camera. L2F will allow users to advertise the existence of a file or device they want to share with others within their computer, without having to place this file on a web-server. In effect, they will now have the ability to identify specific files (as a part of a string in an e-mail, through a separate utility, or even to publish such a link within a web-page), without having to actually transfer the file with that e-mail, only the pointer to the file. This will allow a user to use a relatively modest amount of space (that attaches to an e-mail or resides in a public or private web-page) as a handle to their home computer. By deciphering the information on this modest link, a program within their computer will be able to use the L2F system to connect in a P2P format with the computer specified in the link, and transfer large files between them. In effect, the functionality of a large storage web-site will be replicated in a home or small business computer, independently of whether, and whenever their ISP changes their IP address.

The present invention was conceived, and one of its objectives is, to provide a system by which computers can be uniquely identified and located in spite of the fact their IP address is changed in order to P2P link them, It is another objective of the present invention to provide the capability to "serve" files to others without compromising security or information about the file's location, It is another objective of the present invention to provide the capability to "serve" files to others using the broadband connection as a limit, instead of having to rent expensive 24/7 storage space on a server farm, It is another objective of the present invention to provide the capability to have the user's computer identified uniquely, allowing user's to find each other, and make phone calls to each other.

It is another objective of the present invention to provide the capability to identify peripheral devices within a computer (such as web cameras or microphones), allowing users to check these devices on a vacation home, or interact with their pets on their home while working or traveling.

It is another objective of the present invention to provide the capability to optionally encrypt the information transferred between server and client.

Other objects, features, and advantages of the present invention will become apparent upon examining the following detailed description of an embodiment thereof, taken in conjunction with the attached drawings.

DETAILED DESCRIPTION OF THE PREFERRED EMBODIMENT

A computer location within the Internet is determined by its Internet Protocol (IP) address. This IP address is represented as a four group numerical address (in the format W.X.Y.Z where each letter represents a binary value between 0 and 255), that uniquely identifies each gateway to every other computer in the Internet. Typically, this Gateway is a Cable or DSL modem 1. Note that while it uses the same format, this IP address must not be confused with the more common network address (NA) residing in a network (wired or wireless) router 2. The NA uses the same format (A.B.C.D, where each letter represents a 0-255 binary value) to uniquely identify a computer within a network group (e.g. Local Area Network or LAN) to other computers in that network. In the most common Windows OS, the NA can be forced to be permanent (during setup), or allowed to float within a range.

Usually, it is the function of the network router to translate the NA to IP addresses. Similar to the way the zip code represents an area, and the street address within a zip code is unique from the same Street address in a different zip code. While the NA may be controlled by the user (as is the case of a home network where the user is usually also the network administrator), the IP Address, is controlled not by the user, but by the user's Internet Service Provider (ISP).

Most users of broadband Internet have contracts with their ISP that allows for the re-assignment of IP addresses at the discretion of the ISP. This means that the device's unique address (and hence how it is known to other computers out in the Internet) is subject to change by the Internet Service Provider (ISP). By changing the IP address, (i.e. the unique address by which a user's computer was known), automated P2P connections between machines become impossible (since the connecting machines identities are suddenly in doubt).

Figure 1:
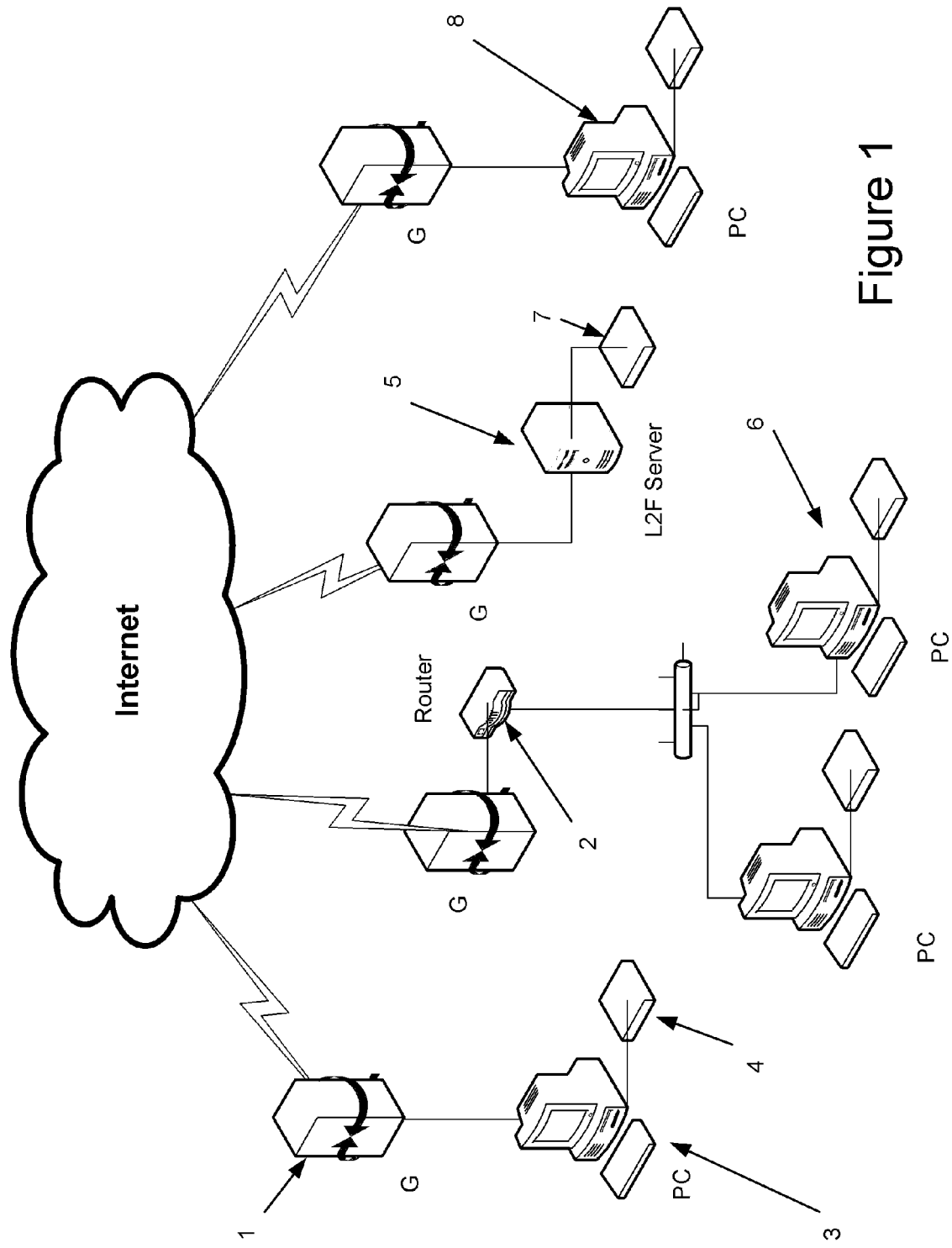
FIG. 1 Basic Topology of the Link2File network
FIG. 2 Link2File message structure

As seen on FIG. 1, ISP's change the IP address of the gateway 1, over time it becomes impossible for Internet users to have a file reside in their computer and automatically be shared by others (the typical function of a web-server). Instead, user's typically share files by attaching them to e-mails. However, in order to limit the use of their bandwidth, most e-mail providers limit the size of attachments to files no larger than 10 or 20 Mbytes. With the wide availability of digital media in which to store home movies, many users are hard pressed to find ways in which to electronically share home movie files that are typically in the 10 MB per minute range.

The Link2File (L2F) system handles the change of IP address by maintaining a central server 5, where the IP address of all computers running the L2F broadband server software are constantly updated. This maintains the resolution between L2F User ID and L2F broadband server IP address (i.e. the most recent one). This central server is a traditional Internet fixed name and fixed IP address fixture. That is, maintained in the traditional way, in which the name www.link2file.com is registered with ICANN and resolvable by all computers on the Internet. This allows the originator of a large file 3 to identify it within their computer hard drive 4, and then serve it to other computers in the Internet via an automated P2P transfer. The L2F broadband server is thus a location for the L2F software within the user's computer 4 to "check-in" regularly (in the preferred embodiment this may be done as frequently as boot-up or every five minutes), thus maintaining a mapping of L2F User ID to IP address table up to date.

In the preferred embodiment, the system is split into two separate functions, that of the L2F broadband server (server), and the L2F client (client). As their names imply, the server is the program that processes making a file available to others, whereas the client is involved with the requesting of files from other computers. While a single computer may run both processes, it is not required that both be available. In fact, we expect the client to outnumber the server by a factor.

Figure 2:
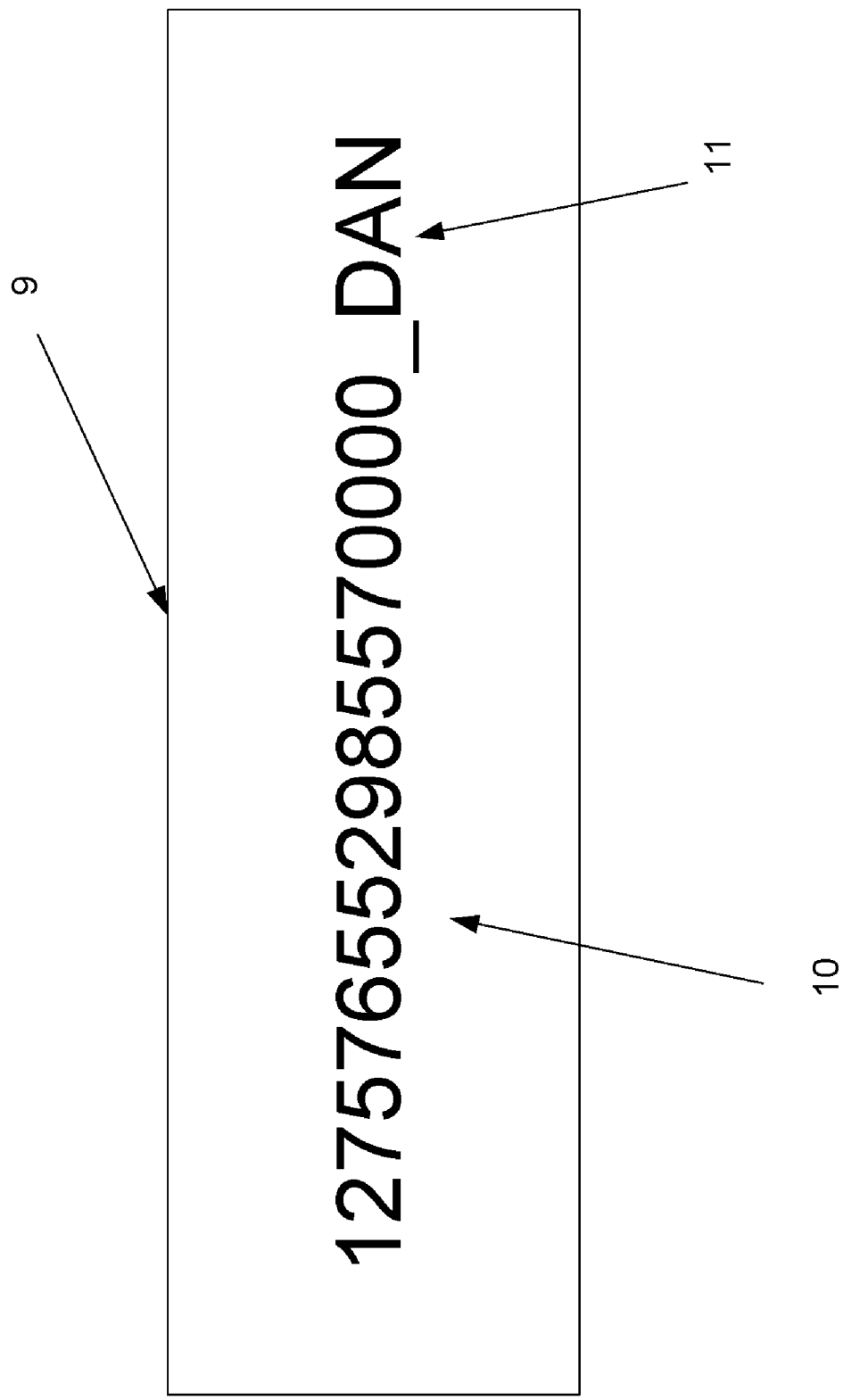

To better understand the process, let's begin by serving a file. Please note that while the term file is used frequently, the output of a video camera or microphone might also be considered for purposes of this discussion as a file, one whose size continues to grow as the data is captured. A user activates the L2F broadband server software, which first generates a L2F data packet 9. This data packet contains a mapping of the file name and location. As seen in FIG. 2, this data packet is a unique (to this user) 18 digit number 10, coupled with the L2F user ID 11. This unique identification acts as a pointer to a transaction that the server knows about, i.e. allows for the file (or call, or data channel, or whatever the L2F request is) to be identified by other computers, without the actual information (name, size, location within the server hard drive) becoming known. The user may then communicates this data packet to any L2F client via e-mail, e-mail attachment, an HTML link, or an HTML link embedded in a web-page (as a hot-link), or even by actually giving the information (18 digits and User ID) over a phone or fax (although of course this is suboptimal). In the preferred embodiment, this becomes part of an attachment that has the .l2f extension, although this nomenclature may be changed. As long as the server maintains a list of packet numbers and processes associated to them, (e.g. the file wanting to be transferred still resides in the computer 4 in the specified location), the packet (and it's associated process) may be requested by any L2F client that has knowledge of its existence. Thus to exchange large files (or connect to a video camera), all that needs to be exchanged is this short message, in the order of bytes, not KB or MB.

The person or person(s) receiving the e-mail (or link, or clicking on the web-site) must each have the L2F client running in their computer. The client processes the information in the .l2f packet, and proceeds to act on it. When they receive a link, their computer 6, first checks with the L2F central server 5 (www.link2file.com to see what the IP address is for the stated L2F ID (contained 11) within the L2F message 9. With the server's 4 IP address, the client 6 can then communicate directly, and request the file identified by the message header 10. The server proceeds to identify the actual file represented by this numerical combination, and serves the file directly to the client via a P2P transaction.

Note that if the server is busy, off-line, or otherwise indisposed, the client will simply continue to try to establish a connection during a pre-determined interval, or be ultimately turned off by the user. Hence neither the server, nor the client need be manned when the file is transferred. In addition, when the connection is established, the data transfer can be performed as a low priority task, with minimal effect on other transactions through this gateway. While the same computer may run both applications (acting both as a server and client), the server application will be to be constantly aware of the local computer's IP address, and communicate this to the central L2F broadband server. This will ensure that if the ISP changes IP addresses, the L2F system is always able to identify the location of the computer. In addition, the transfer may occur via an encrypted link, whose initiation and synchronization can be started by the L2F authentication procedure.

Before initiating a transfer, the server may act as a "traffic cop". If the server configuration commands it to limit the number of transfers, or to in any other fashion deny file transfer (e.g. the file may have been erased since it was "offered" for transfer), the server may deny the transaction.

Besides transferring files, the ability to find and uniquely identify a computer's changing IP address provides for other advantages to the user. They may decide to use their computer as a telephone, hence allowing for a call to a particular L2F ID to become a call to a particular computer user (regardless of where the computer is located).

Similarly, separate software applications may be used to connect remotely to a video/audio feed. In this way, the user could remotely log onto his vacation's home computer and check the video from surveillance cameras, even being able to interface via audio with a pet or intruder.

CONCLUSION

Link2File provides for a system that makes possible the unattended automated location and identification of computers whose IP address is randomly re-assigned by a third party. In addition, it would allow for the automated transfer of files in a peer-to-peer fashion, without either party having to be present, as well as for the initiation of video and/or audio feeds between these computers. These transfers may also be done in an encrypted fashion.

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A computer-implemented method for locating and sharing information between computers in a computer network where the IP address of a central server is fixed, but the IP address of two or more connecting computers is subject to change, comprising steps of;

having a first computer within said computer network send a notification via e-mail to a second computer within said computer network, using known e-mail addresses, said e-mail containing the L2F data packet for the file within said first computer;

having a second computer within said computer network receive said e-mail with the L2F data packet, read from the MIME header within said e-mail the IP address for said first computer, and using a combination of said first computer IP address and the L2F data packet information, establish a peer-to-peer (P2P) connection between said first and second computer; and;

beginning a P2P data exchange process of one or more files identified in the L2F data packet between said first and said second.

2. The method of claim 1 wherein;
   the data exchange leads to the establishment of an audio channel between the computers.

3. The method of claim 1, wherein;
   the data exchange leads to the establishment of an audio/video/data link between the computers.

* * * * *